(12) United States Patent
Liu

(10) Patent No.: US 11,855,562 B1
(45) Date of Patent: Dec. 26, 2023

(54) AUTOMATIC CONTROL SYSTEM FOR PHASE ANGLE OF MOTOR

(71) Applicant: ANPEC ELECTRONICS CORPORATION, Hsinchu (TW)

(72) Inventor: Yi-Cheng Liu, New Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/880,197

(22) Filed: Aug. 3, 2022

(30) Foreign Application Priority Data

Jun. 13, 2022 (TW) .................................. 111121794

(51) Int. Cl.
*H02P 21/09* (2016.01)
*H02P 23/14* (2006.01)

(52) U.S. Cl.
CPC .................................. *H02P 23/14* (2013.01)

(58) Field of Classification Search
CPC .................................. H02P 21/09; H02P 23/14
See application file for complete search history.

(56) References Cited

U.S. PATENT DOCUMENTS

| | | | | |
|---|---|---|---|---|
| 5,550,450 A * | 8/1996 | Palko | ....................... | H02P 21/06 318/811 |
| 6,121,736 A * | 9/2000 | Narazaki | ................. | H02P 6/182 318/608 |
| 6,535,402 B1 | 3/2003 | Ying et al. | | |
| 10,348,228 B1 | 7/2019 | Yang et al. | | |
| 2006/0056823 A1 * | 3/2006 | Wu | ........................... | H02P 6/15 388/831 |
| 2006/0290312 A1 * | 12/2006 | Nagai | ..................... | H02P 6/182 318/599 |
| 2008/0018279 A1 * | 1/2008 | Fukamizu | ............... | H02P 6/182 318/432 |
| 2009/0200974 A1 * | 8/2009 | Yasui | ........................ | H02P 6/18 318/400.33 |
| 2019/0356248 A1 * | 11/2019 | Watanabe | ............... | H02P 27/06 |
| 2020/0119668 A1 * | 4/2020 | Sugie | ................. | G11B 19/2009 |

FOREIGN PATENT DOCUMENTS

TW 200412006 A 7/2004
TW 201947865 A 12/2019

* cited by examiner

*Primary Examiner* — Kawing Chan
*Assistant Examiner* — Gabriel Agared
(74) *Attorney, Agent, or Firm* — Li & Cai Intellectual Property (USA) Office

(57) ABSTRACT

An automatic control system for a phase angle of a motor is provided. A current detector circuit detects a current signal of the motor to output a current detected signal. A control circuit outputs a control signal according to the current detected signal indicating a time point at which the current signal reaches a zero value. A driver circuit outputs a driving signal according to the control signal. An output circuit operates to output a motor rotation adjusting signal to the motor to adjust a rotational state of the motor according to the driving signal.

8 Claims, 5 Drawing Sheets

AUTOMATIC CONTROL SYSTEM FOR PHASE ANGLE OF MOTOR

CROSS-REFERENCE TO RELATED PATENT APPLICATION

This application claims the benefit of priority to Taiwan Patent Application No. 111121794, filed on Jun. 13, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to an automatic control system for a phase angle of a motor.

BACKGROUND OF THE DISCLOSURE

In electronic devices, fans are used to cool heat generating components such as processors. When the heat generating components are cooled down by the fans, motors of the fans must be precisely controlled such that the fans can properly cool down the heat generating components with high efficiency. However, a conventional motor controller is only applicable to one type of fan. When the conventional motor controller is applied to control other types of fans, the motors of those fans are prone to rotate with low efficiency and generate high noise.

SUMMARY OF THE DISCLOSURE

In response to the above-referenced technical inadequacies, the present disclosure provides an automatic control system for a phase angle of a motor. The automatic control system is applicable to a motor. The automatic control system includes a current detector circuit, a control circuit, a driver circuit and an output circuit. The current detector circuit is configured to detect a current signal of the motor to output a current detected signal. The control circuit is connected to the current detector circuit. The control circuit is configured to determine whether or not a rotational state of the motor needs to be adjusted to output a control signal, according to the current detected signal indicating a time point at which a current value of the current signal reaches a zero value. The driver circuit is connected to the control circuit. The driver circuit is configured to output a driving signal according to the control signal. The output circuit is connected to the driver circuit and the motor. The output circuit is configured to operate to output a motor rotation adjusting signal to the motor to adjust the rotational state of the motor according to the driving signal.

In certain embodiments, the control circuit determines whether or not the time point at which the current value of the current signal reaches the zero value falls within a dead time to determine whether or not the rotational state of the motor needs to be adjusted such that the time point falls within the dead time.

In certain embodiments, the output circuit includes a plurality of high-side switches and a plurality of low-side switches. The control circuit controls the driver circuit to turn off the plurality of high-side switches and the plurality of low-side switches at the same time within the dead time.

In certain embodiments, after the dead time ends, the control circuit detects a back electromotive force of the motor to determine a position of a rotor of the motor within a back electromotive force detection time. The control circuit controls the driver circuit to drive the output circuit according to the position of the rotor of the motor.

In certain embodiments, when the control circuit determines that the time point at which the current value of the current signal reaches the zero value is earlier than the dead time, the control circuit controls the driver circuit to drive the output circuit to decrease the phase angle of the current signal of the motor.

In certain embodiments, when the control circuit determines that the time point at which the current value of the current signal reaches the zero value is later than the dead time, the control circuit controls the driver circuit to drive the output circuit to increase the phase angle of the current signal of the motor.

In certain embodiments, the control circuit determines whether or not the rotational state of the motor needs to be adjusted according to waveforms of the current signal that are indicated by the current detected signal.

In certain embodiments, when the control circuit determines that the phase angle of the current signal is not equal to a predicted phase angle according to a plurality of current values of waveforms of the current signal at a plurality of time points, the control circuit determines that the rotational state of the motor needs to be adjusted.

In certain embodiments, when the control circuit determines that the phase angle of the current signal is larger than a predicted phase angle according to a plurality of current values of waveforms of the current signal at a plurality of time points, the control circuit determines that the phase angle of the motor needs to be decreased to output the control signal.

In certain embodiments, when the control circuit determines that the phase angle of the current signal is smaller than a predicted phase angle according to a plurality of current values of waveforms of the current signal at a plurality of time points, the control circuit determines that the phase angle of the motor needs to be increased to output the control signal.

In certain embodiments, the motor is a single motor or a three-phase motor.

As described above, the present disclosure provides the automatic control system for the phase angle of the motor. The automatic control system of the present disclosure is applicable to detect the current values of the current signals of the motors of various types of electronic devices such as fans. The automatic control system of the present disclosure, according to the time point at which the current values of the current signals of the motors reach the zero value, determines whether or not the phase angles of the motors need to be corrected automatically to reduce vibration and noise of the motors.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
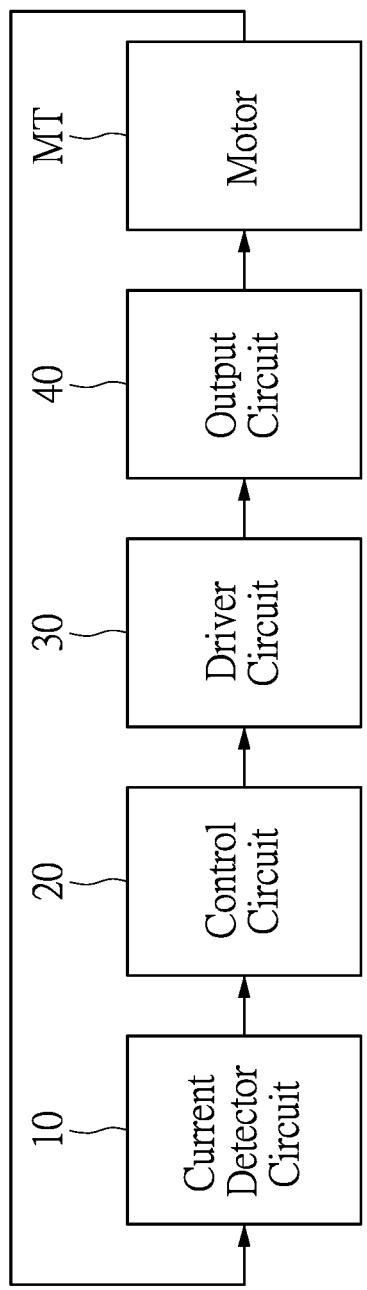
FIG. 1 is a block diagram of an automatic control system for a phase angle of a motor according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of an automatic control system for a phase angle of a motor according to an embodiment of the present disclosure.

As shown in FIG. 1, the automatic control system of the embodiment of the present disclosure may include a current detector circuit 10, a control circuit 20, a driver circuit 30 and an output circuit 40, which are applicable to a motor MT such as a single motor or a three-phase motor.

The current detector circuit 10 may be connected to the control circuit 20 and the driver circuit 30. The output circuit 40 may be connected to the driver circuit 30 and the motor MT.

The current detector circuit 10 may detect a current signal of the motor MT to output a current detected signal. The control circuit 20 may receive the current detected signal from the current detector circuit 10. The control circuit 20 may, according to the current detected signal indicating a time point at which a current value of the current signal reaches a zero value, determine whether or not a rotational state of the motor MT needs to be adjusted to output a control signal.

The driver circuit 30 may receive the control signal from the control circuit 20, and may output a driving signal according to the control signal. The output circuit 40 may operate to output a motor rotation adjusting signal to the motor MT to adjust the rotational state of the motor MT, according to the driving signal from the driver circuit 30.

Figure 2:
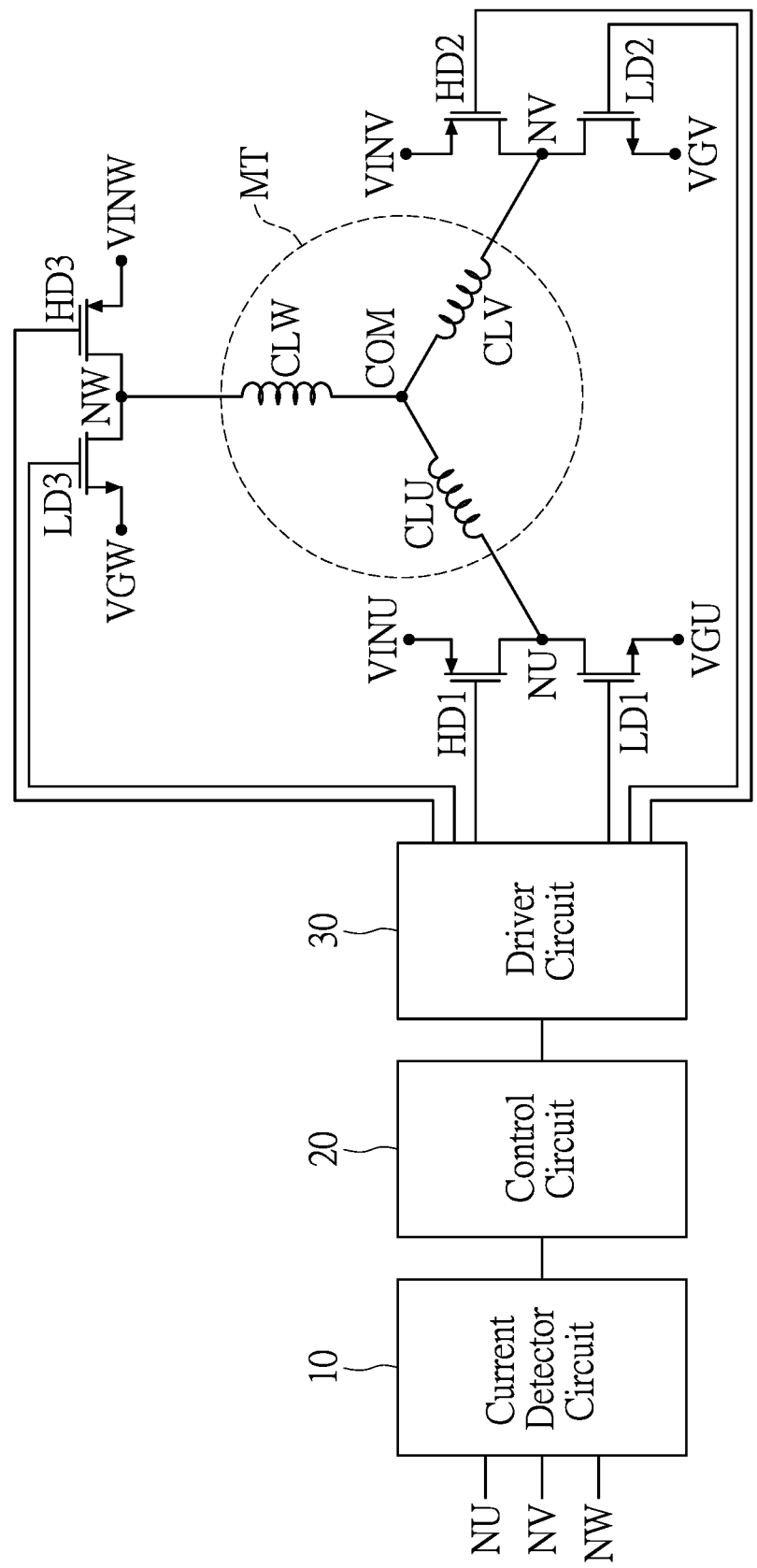
FIG. 2 is a schematic diagram of the motor and the automatic control system for the phase angle of the motor according to the embodiment of the present disclosure.

Reference is made to FIGS. 1 and 2, in which FIG. 1 is a block diagram of an automatic control system for a phase angle of a motor according to an embodiment of the present disclosure, and FIG. 2 is a schematic diagram of the motor and the automatic control system for the phase angle of the motor according to the embodiment of the present disclosure.

The output circuit 40 as shown in FIG. 1 may include a plurality of high-side switches such as a first high-side switch HD1, a second high-side switch HD2 and a third high-side switch HD3 as shown in FIG. 2. In addition, the output circuit 40 may include a plurality of low-side switches such as a first low-side switch LD1, a second low-side switch LD2 and a third low-side switch LD3 as shown in FIG. 2. The high-side switches and the low-side switches may be various types of transistors, but the present disclosure is not limited thereto.

A first terminal of the first high-side switch HD1 may be coupled to a first input voltage VINU. A second terminal of the first high-side switch HD1 may be connected to a first terminal of the first low-side switch LD1. A second terminal of the first low-side switch LD1 may be coupled to a first reference voltage VGU. For example, the second terminal of the first low-side switch LD1 may be grounded. A node NU between the second terminal of the first high-side switch HD1 and the first terminal of the first low-side switch LD1 may be connected to the motor MT. For example, the node NU may be connected to a first terminal of a first coil CLU of a U phase of the motor MT such as the three-phase motor. A second terminal of the first coil CLU may be connected to a common terminal COM.

A first terminal of the second high-side switch HD2 may be coupled to a second input voltage VINV. A second terminal of the second high-side switch HD2 may be connected to a first terminal of the second low-side switch LD2. A second terminal of the second low-side switch LD2 may be coupled to a second reference voltage VGV. For example, the second terminal of the second low-side switch LD2 may be grounded. A node NV between the second terminal of the second high-side switch HD2 and the first terminal of the second low-side switch LD2 may be connected to the motor MT. For example, the node NV may be connected to a first terminal of a second coil CLU of a V phase of the motor MT such as the three-phase motor. A second terminal of the second coil CLU may be connected to the common terminal COM.

A first terminal of the third high-side switch HD3 may be coupled to a third input voltage VINW. A second terminal of the third high-side switch HD3 may be connected to a first terminal of the third low-side switch LD3. A second terminal of the third low-side switch LD3 may be coupled to a third reference voltage VGW. For example, the second terminal of the third low-side switch LD3 may be grounded. A node NW between the second terminal of the third high-side switch HD3 and the first terminal of the third low-side switch LD3 may be connected to the motor MT. For example, the node NW may be connected to a first terminal of a third coil CLW of the motor MT such as the three-phase motor. A second terminal of the third coil CLW may be connected to the common terminal COM.

The current detector circuit 10 may be electrically connected to or in electrical contact with the motor MT. For example, the current detector circuit 10 may be electrically connected to or in electrical contact with the first terminal of the first coil CLU of the U phase of the motor MT, the first terminal of the second coil CLV of the V phase of the motor MT, and the first terminal of the third coil CLW of the W phase of the motor MT such as the three-phase motor. The current detector circuit 10 may detect the current signal flowing through each or any one of the first coil CLU of the U phase, the second coil CLV of the V phase, and the third coil CLW of the W phase of the motor MT such as the three-phase motor.

Alternatively, the current detector circuit 10 may be electrically connected to or in electrical contact with the node NU between the second terminal of the first high-side switch HD1 and the first terminal of the first low-side switch LD1. The current detector circuit 10 may be electrically connected to or in electrical contact with the node NV between the second terminal of the second high-side switch HD2 and the first terminal of the second low-side switch LD2. The current detector circuit 10 may be electrically connected to or in electrical contact with the node NW between the second terminal of the third high-side switch HD3 and the first terminal of the third low-side switch LD3. The current detector circuit 10 may detect the current signal flowing through each or any one of the node NU, the node NV and the node NW.

The current detector circuit 10 may detect the current signal to output the current detected signal to the control circuit 20. It is worth noting that, the control circuit 20 may, according to the current detected signal indicating the time point at which the current value of the current signal of any one of the phases of the motor MT reaches the zero value, determine whether or not the rotational state of the motor MT needs to be adjusted to output a plurality of control signals to the driver circuit 30.

The driver circuit 30 may be connected to a control terminal of the first high-side switch HD1, a control terminal of the second high-side switch HD2, a control terminal of the third high-side switch HD3, a control terminal of the first low-side switch LD1, a control terminal of the second low-side switch LD2, and a control terminal of the third low-side switch LD3.

The driver circuit 30 may, according to the plurality of control signals from the control circuit 20, output a plurality of driving signals respectively to the control terminal of the first high-side switch HD1, the control terminal of the second high-side switch HD2, the control terminal of the third high-side switch HD3, the control terminal of the first low-side switch LD1, the control terminal of the second low-side switch LD2, and the control terminal of the third low-side switch LD3 in the output circuit 40. The output circuit 40 is driven to adjust the rotational state of the motor MT according to the plurality of driving signals.

Figure 3:
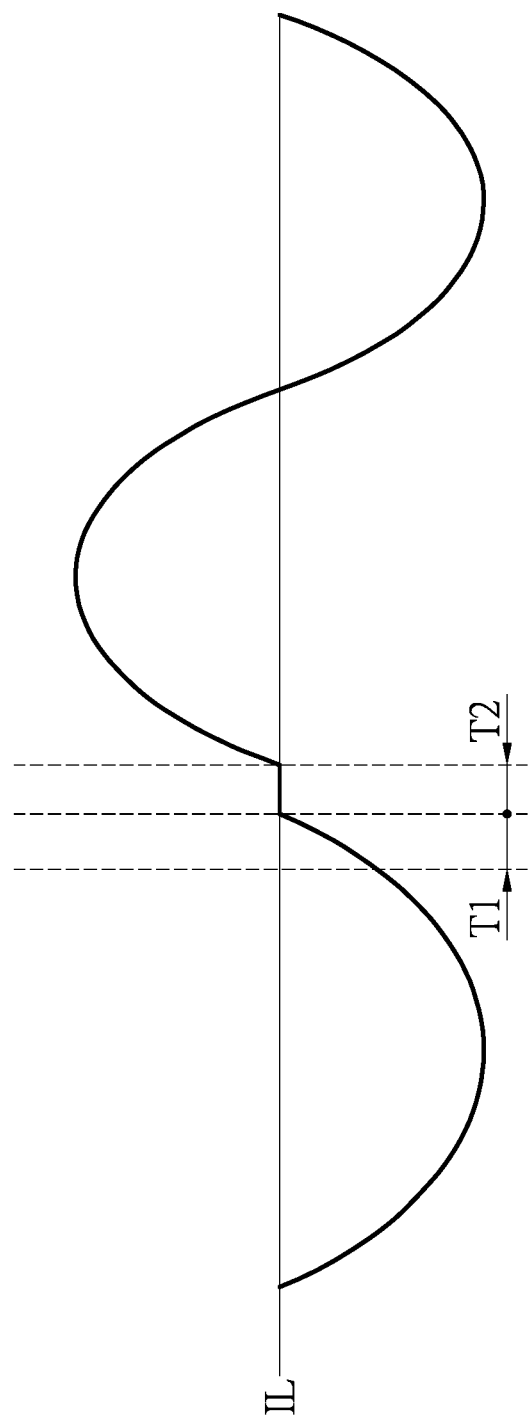
FIG. 3 is a schematic diagram of a predicted phase angle of a current signal of the motor controlled by the automatic control system according to the embodiment of the present disclosure.
Figure 4:
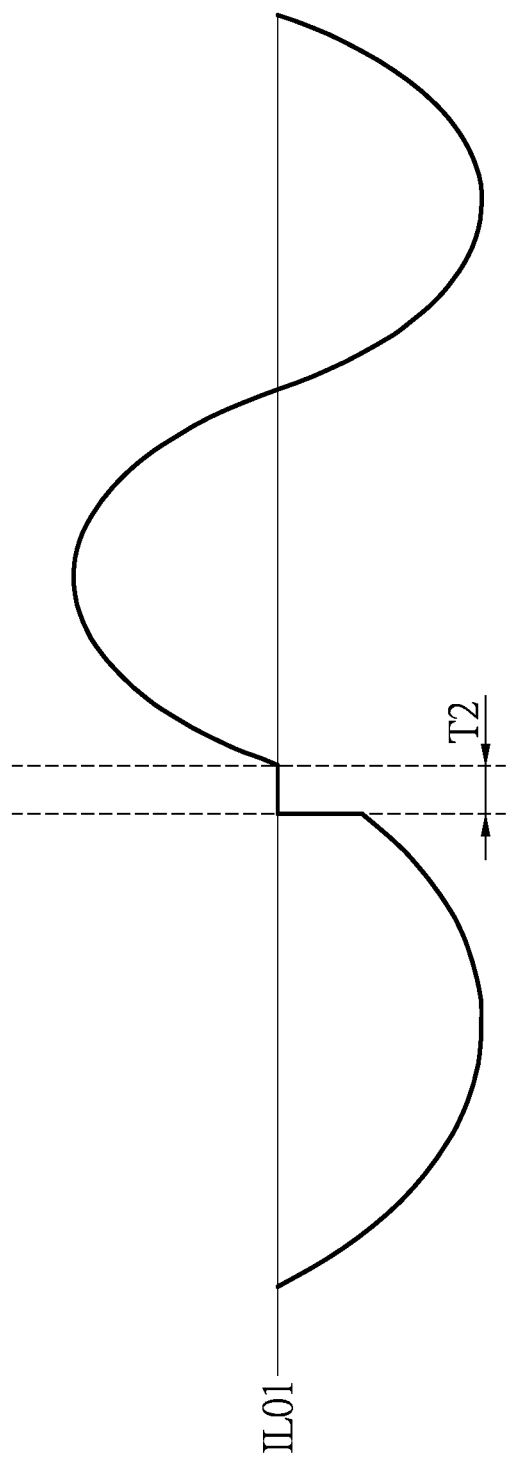
FIG. 4 is a schematic diagram of a phase angle that is too small of a current signal of the motor controlled by the automatic control system according to the embodiment of the present disclosure.
Figure 5:
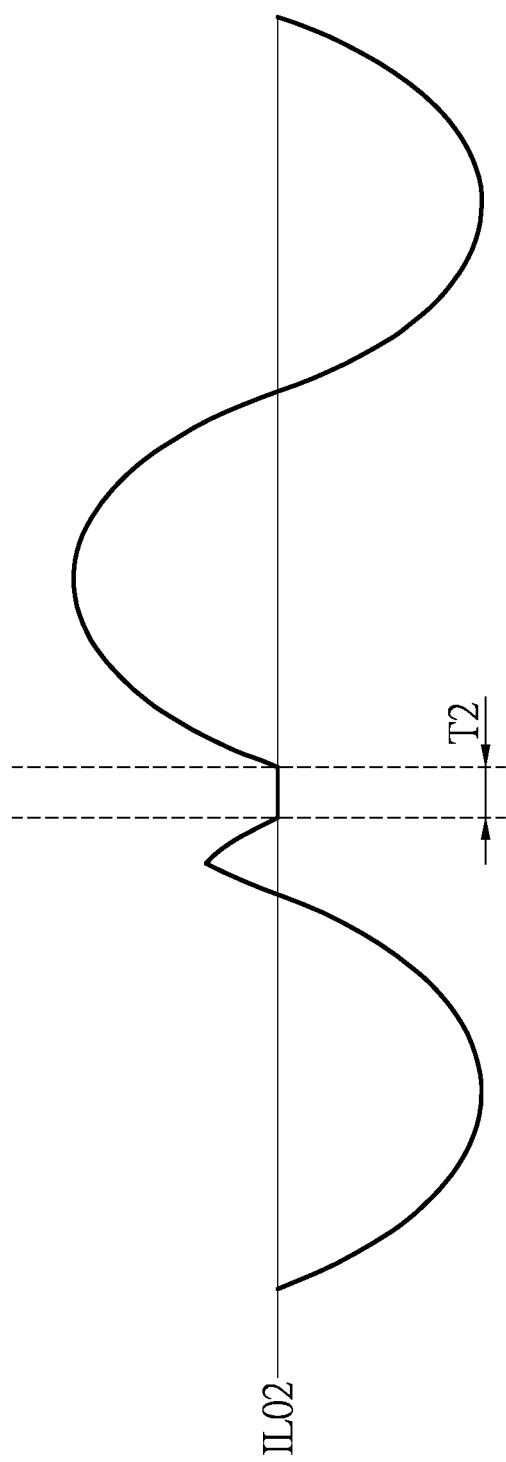
FIG. 5 is a schematic diagram of a phase angle that is too large of a current signal of the motor controlled by the automatic control system according to the embodiment of the present disclosure.

Reference is made to FIGS. 3, 4 and 5, in which FIG. 3 is a schematic diagram of a predicted phase angle of a current signal of the motor controlled by the automatic control system according to the embodiment of the present disclosure, FIG. 4 is a schematic diagram of a too-small phase angle of a current signal of the motor controlled by the automatic control system according to the embodiment of the present disclosure, and FIG. 5 is a schematic diagram of a too-large phase angle of a current signal of the motor controlled by the automatic control system according to the embodiment of the present disclosure.

The control circuit 20 as shown in FIG. 1 may control the driver circuit 30 to turn off the plurality of high-side switches (such as the first high-side switch HD1, the second high-side switch HD2 and the third high-side switch HD3 as shown in FIG. 2) and the plurality of low-side switches (such as the first low-side switch LD1, the second low-side switch LD2 and the third low-side switch LD3 as shown in FIG. 2) of the output circuit 40 at the same time, within a dead time T1 as shown in FIG. 3.

The control circuit 20 may determine whether or not the time point at which the current value of the current signal of the motor MT reaches the zero value falls within the dead time T1 to determine whether or not the rotational state of the motor MT needs to be adjusted such that the time point falls within the dead time T1.

When the control circuit 20 determines that the time point at which the current value of the current signal of the motor MT reaches the zero value is earlier than the dead time T1, the control circuit 20 outputs the control signal having a phase angle decreasing indication message to the driver circuit 30. The driver circuit 30, according to the control signal having the phase angle decreasing indication message, drives the output circuit 40 to adjust the rotational state of the motor MT to decrease the phase angle of the current signal of the motor MT.

Conversely, when the control circuit 20 determines that the time point at which the current value of the current signal of the motor MT reaches the zero value is later than the dead time T1, the control circuit 20 outputs the control signal having a phase angle increasing indication message to the driver circuit 30. The driver circuit 30, according to the control signal having the phase angle increasing indication message, drives the output circuit 40 to adjust the rotational state of the motor MT to increase the phase angle of the current signal of the motor MT.

The control circuit 20 may determine whether or not the rotational state of the motor MT needs to be adjusted, according to the current detected signal indicating a plurality of current values of waveforms of the current signal of the motor MT respectively at a plurality of time points.

When the control circuit 20 determines that the phase angle of the current signal of the motor MT is not equal to a predicted phase angle according to the current values of the waveforms of the current signal of the motor MT at the time points, the control circuit 20 determines that the rotational state of the motor MT needs to be adjusted.

For example, a phase angle of a current signal IL01 of the motor MT is shown in FIG. 4 as being too small. As a result, the motor MT vibrates and generates high noise, and a commutation point of the motor MT is incorrectly determined. When the control circuit 20 determines that the phase angle of the current signal IL01 of the motor MT is smaller than the predicted phase angle according to a plurality of current values of waveforms of the current signal of the motor MT at a plurality of time points, the control circuit 20 outputs the control signal having the phase angle increasing indication message to the driver circuit 30. The driver circuit 30 drives the output circuit 40 to operate according to the control signal having the phase angle increasing indication message. As a result, the motor MT generates a current signal IL of which a phase angle is equal to the predicted phase angle as shown in FIG. 3.

Conversely, as shown in FIG. 5, a phase angle of a current signal IL02 of the motor MT is too large. At this time, the motor MT operates at a low efficiency while the motor MT vibrates and generates high noise. When the control circuit 20 determines that the phase angle of the current signal of the motor MT is larger than the predicted phase angle according to a plurality of current values of waveforms of the current signal IL02 at a plurality of time points, the control circuit 20 outputs the control signal having the phase angle decreasing indication message to the driver circuit 30. The driver circuit 30 drives the output circuit 40 to operate according to the control signal having the phase angle decreasing indication message. As a result, the motor MT generates the current signal IL of which the phase angle is equal to the predicted phase angle as shown in FIG. 3.

After the dead time T1 ends, the control circuit 20 or other detector circuits may detect back electromotive force of each of the phases of the motor MT to determine a position of a rotor of the motor MT within a back electromotive force detection time T2. The control circuit 20 may control the driver circuit 30 to drive the output circuit 40 so as to control the motor MT to rotate according to the position of the rotor of the motor MT.

In conclusion, the present disclosure provides the automatic control system for the phase angle of the motor. The automatic control system of the present disclosure is applicable to detect the current values of the current signals of the motors of various types of electronic devices such as fans. The automatic control system of the present disclosure, according to the time point at which the current values of the current signals of the motors reach the zero value, determines whether or not the phase angles of the motors need to be corrected automatically to reduce the vibration and the noise of the motors.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An automatic control system for a phase angle of a motor, which is applicable to a motor, the automatic control system comprising:
   a current detector circuit configured to detect a current signal of the motor to output a current detected signal;
   a control circuit connected to the current detector circuit, and configured to determine whether or not a time point at which a current value of the current signal reaches a zero value falls within a dead time according to the current detected signal, and accordingly to determine whether a rotational state of the motor needs to be adjusted such that the time point at which the current value of the current signal reaches the zero value falls within the dead time to output a control signal;
   a driver circuit connected to the control circuit and configured to output a driving signal according to the control signal; and
   an output circuit connected to the driver circuit and the motor, and configured to operate to output a motor rotation adjusting signal to the motor to adjust the rotational state of the motor according to the driving signal;
   wherein, when the control circuit determines that the time point at which the current value of the current signal of the motor reaches the zero value is earlier than the dead time, the control circuit outputs the control signal having a phase angle decreasing indication message to the driver circuit, and the driver circuit drives the output circuit to adjust the rotational state of the motor to decrease the phase angle of the current signal of the motor such that the time point at which the current value of the current signal reaches the zero value falls within the dead time according to the control signal having the phase angle decreasing indication message;
   wherein, when the control circuit determines that the time point at which the current value of the current signal of the motor reaches the zero value is later than the dead time, the control circuit outputs the control signal having a phase angle increasing indication message to the driver circuit, and the driver circuit drives the output circuit to adjust the rotational state of the motor to increase the phase angle of the current signal of the motor such that the time point at which the current value of the current signal reaches the zero value falls within the dead time according to the control signal having the phase angle increasing indication message.

2. The automatic control system according to claim 1, wherein the output circuit includes a plurality of high-side switches and a plurality of low-side switches, and the control circuit controls the driver circuit to turn off the plurality of high-side switches and the plurality of low-side switches at the same time within the dead time.

3. The automatic control system according to claim 1, wherein, after the dead time ends, the control circuit detects a back electromotive force of the motor to determine a position of a rotor of the motor within a back electromotive force detection time, and controls the driver circuit to drive the output circuit according to the position of the rotor of the motor.

4. The automatic control system according to claim 1, wherein the control circuit determines whether or not the rotational state of the motor needs to be adjusted according to waveforms of the current signal that are indicated by the current detected signal.

5. The automatic control system according to claim 1, wherein, when the control circuit determines that the phase angle of the current signal is not equal to a predicted phase angle according to a plurality of current values of waveforms of the current signal at a plurality of time points, the control circuit determines that the rotational state of the motor needs to be adjusted.

6. The automatic control system according to claim 1, wherein, when the control circuit determines that the phase angle of the current signal is larger than a predicted phase angle according to a plurality of current values of waveforms of the current signal at a plurality of time points, the control circuit determines that the phase angle of the motor needs to be decreased to output the control signal.

7. The automatic control system according to claim 1, wherein, when the control circuit determines that the phase angle of the current signal is smaller than a predicted phase angle according to a plurality of current values of waveforms of the current signal at a plurality of time points, the control circuit determines that the phase angle of the motor needs to be increased to output the control signal.

8. The automatic control system according to claim 1, wherein the motor is a single-phase motor or a three-phase motor.

\* \* \* \* \*